US006768066B2

(12) United States Patent
Wehrenberg (10) Patent No.: US 6,768,066 B2
(45) Date of Patent: Jul. 27, 2004

(54) METHOD AND APPARATUS FOR DETECTING FREE FALL

(75) Inventor: Paul James Wehrenberg, Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 10/348,465

(22) Filed: Jan. 21, 2003

(65) Prior Publication Data

US 2003/0128475 A1 Jul. 10, 2003

Related U.S. Application Data

(62) Division of application No. 09/678,541, filed on Oct. 2, 2000, now Pat. No. 6,520,013.

(51) Int. Cl.[7] ............................................. H01H 35/14
(52) U.S. Cl. ............................ 200/61.49; 200/61.45 R; 200/61.48
(58) Field of Search .................... 200/61.45 R–61.45 M (56) References Cited

U.S. PATENT DOCUMENTS

| 3,721,956 A | * | 3/1973 | Hamann et al. ............. 340/429 |
| 3,790,727 A | * | 2/1974 | Laserson et al. .......... 200/61.49 |
| 4,311,891 A | * | 1/1982 | Faust .................... 200/61.45 R |
| 4,513,183 A | * | 4/1985 | Hill ..................... 200/61.45 R |
| 4,862,302 A | * | 8/1989 | Ekhoff ......................... 360/105 |
| 5,227,929 A | * | 7/1993 | Comerford .................... 360/75 |
| RE35,269 E | * | 6/1996 | Comerford .................... 360/75 |
| 5,789,716 A | * | 8/1998 | Wang .................. 200/61.45 R |
| 5,955,712 A | * | 9/1999 | Zakutin ................... 200/61.48 |
| 6,028,275 A | * | 2/2000 | Jou .......................... 200/61.52 |
| 6,046,877 A | * | 4/2000 | Kelsic ........................ 360/75 |
| 6,369,706 B1 | * | 4/2002 | Anderson et al. ........... 340/521 |
| 6,448,516 B1 | * | 9/2002 | Chiang ................ 200/61.45 R |
| 6,545,235 B1 | * | 4/2003 | Chou ....................... 200/61.51 |

FOREIGN PATENT DOCUMENTS

EP 0 658 894 A1 6/1995

OTHER PUBLICATIONS

PCT–Invitation to Pay Additional Fees, International Application No. PCT/US01/30387, Date of Mailing: May 27, 2002, p. 6 total.

* cited by examiner

Primary Examiner—Michael A. Friedhofer
(74) Attorney, Agent, or Firm—Blakely, Sokoloff, Taylor & Zafman LLP (57) ABSTRACT

A data processing system including a data storage device having data stored on a data storage medium. Within said data processing system, a system electronics is operatively coupled to a sensor and to said data storage device. When the sensor senses a change in gravitational or inertial acceleration of said data processing system, it alerts system electronics to temporarily park a read/write head in a safe position.

20 Claims, 8 Drawing Sheets

METHOD AND APPARATUS FOR DETECTING FREE FALL

This application is a divisional application of U.S. patent application Ser. No. 09/678,541, which was filed on Oct. 2, 2000, now U.S. Pat. No. 6,520,013.

FIELD OF THE INVENTION

This invention relates to data storage devices, such as hard disc drive assemblies and data processing systems, generally. In particular, the invention relates to data storage devices that are subject to free fall or other changes in acceleration, for example, storage devices used in portable computers, cameras, onboard vehicular computers, and similar electronic devices. 'Free fall' produces a change in the force, i.e. acceleration, of gravity as perceived in the frame of reference in which the data storage device is at rest.

BACKGROUND

Portable electronics devices such as digital and film cameras, notebook computers, and onboard vehicular computers containing data storage devices such as hard disk drives are often dropped, bumped, or bounced. When an object is dropped or falls back to earth after a bounce, the object experiences free fall, a period of minimal or zero gravitational force. 'Free fall' produces a change in the force, i.e. acceleration, of gravity as perceived in the frame of reference in which the data storage device is at rest. On earth, free fall usually immediately precedes an impact with a surface that may damage operating or unparked data storage devices, their spinning disks, actuators, and read/write heads. A parked data storage device is one in which the actuator has temporarily moved the head away from the spinning disk, and the actuator and head are safely locked in a fixed position in preparation for transportation or an anticipated impact. Because a data storage device can be safely prepared for an impact in a time shorter than the time it takes the data storage device to complete its fall, the present invention has great utility in preventing or mitigating the damage formerly experienced by data storage devices that were dropped down stairs, dropped onto concrete, asphalt or other hard surfaces, or that were bounced into the air from vehicles contacting speed bumps, waves, or turbulent air pockets at high speeds and slammed back down again.

In simplest form, a data storage device, such as a disc drive, consists of a spinning disk and an actuator movably positioned near the surface of the disk. The surface of the disk typically contains multiple annular tracks or grooves in which data is stored and manipulated and from which data is retrieved by a read/write head (e.g. a magnetic or an optical head) positioned on the actuator.

It is important that the data storage head be kept as free from vibrations and/or sudden acceleration or deceleration as possible because the head reads data from and writes data to the multiple annular tracks on the spinning disk. Sudden acceleration or deceleration or excessive vibration of the disk drive can cause the head to skip tracks, to encode information incorrectly on the wrong track or tracks, to erase data previously encoded on the disk, or to dent the disk surface. Several types of sensors have been developed to mitigate or to prevent excessive vibration from harming recorded data, but no sensors measuring changes in the force, i.e. acceleration, of gravity in the frame of the data storage device, existed prior to conception and development of this invention.

One type of vibration detection and protection system found in the field of data storage devices is known as the off track signal or OTS. Generated by an electrical component of a data processing system, such as a magnetic hard disk, or CD, or DVD drive, the OTS is derived from the signals generated by the magnetic hard disk or CD head as it follows data tracks on the disk. The amplitude of the OTS is designed to vary in direct proportion to the amount of vibration experienced by the data processing system. Thus, the more vibration experienced by the data processing system, the more the amplitude of the OTS increases. The system electronics of the data storage device monitors the amplitude of the OTS and temporarily disables the ability of the head to write and/or read information to or from the data storage device whenever the OTS amplitude matches or exceeds a predetermined amplitude.

Although the OTS system protects data stored on the data storage device from being erased or overwritten by the head, it does not prevent damage resulting from the head popping up and down onto the spinning disk when the data storage device is dropped and impacts a surface. For example, if the head slams downward onto a spinning data medium device, such as a CD or DVD or magnetic hard disk, data may be irretrievably lost, the head may be severely damaged, and the CD, DVD, or magnetic hard disk may be irreparably dented.

A second kind of sensor is found in the unrelated automobile field. Sensors in this field are used to deploy various safety devices, such as airbags, whenever an accident occurs. Such sensors passively wait for an impact to occur and then rapidly deploy safety devices before a human's body impacts hard, bone-crushing surfaces within the automobile's interior cabin such as dashboards, windshields, and steering wheels. They cannot predict the possibility of an imminent impact, nor can they detect the absence of a gravitational field as some embodiments of the present invention can. Moreover, sensors found in the automobile field have not been used to protect data in data processing systems such as hard disk drives.

A third type of vibration countermeasure found in the field of consumer portable electronic devices is specifically designed to combat the "skips" commonly associated with audio playback of CD-ROMS and DVD's. "Skips" are miniature, but discernable, periods of silence in music or other audio broadcast material that occur whenever a musical playback device is jostled, vibrated, or dropped. This countermeasure is typically called a "buffering system." In simplest form, a buffering system incorporated within a musical playback device reads audio data from the spinning disk during playback of the disk at a rate slightly faster than the rate at which the audio data is broadcast. By reading "ahead" of the broadcast, a portion of the audio data is continually saved up and stored in the buffer. Whenever a "skip" occurs, the buffering system ensures a smooth, unbroken audio playback by filling the "skip" with audio data from the buffer. Unlike, the present invention, however, the buffering system does not protect the data storage device or its data actuating head from damage caused by dropping or vibrating the device.

SUMMARY OF THE INVENTION

In a preferred embodiment of the present invention, as illustratively described herein, a data processing system is provided. Within the data processing system, system electronics is operatively coupled to a hard disk drive assembly and to an acceleration sensor, which can sense gravitational acceleration. The system electronics monitors the acceleration sensor to determine whether the sensor's switch is open or closed. If an open switch indicating a free fall is detected, the system electronics protects the data read/write head and data storage medium by temporarily parking the head in a safe position where it cannot impact the data storage medium surface. A safe position can include a parked position off to one side of a data storage medium or a secured operating position that prevents vibration from damaging the read/write head or the data storage medium. According to one aspect of the present invention, the term secured includes fixed, semi-fixed, and movable operating positions.

According to an alternate aspect of the present invention, a sensor is provided that can detect changes in gravitational and/or inertial acceleration. In an exemplary embodiment, the sensor includes an electrically conductive tube having two ends. A supporting material may close one end of the tube. The other end may be open or closed. Within the interior of the tube, one end of a flexible beam or wire is inserted into the supporting material. Gravity flexes the opposite end of the beam or wire into contact with the tubular case, creating a closed electrical circuit. Whenever the force of gravity lessens, the second end of the beam or wire breaks contact with the tube, creating an open switch.

According to another aspect of the present invention, a sensor is provided that can detect changes in gravitational and/or inertial acceleration. Illustratively, this sensor includes a closed cylinder. Within the interior of the cylinder, a centrally positioned, electrically conductive beam juts upward from the cylinder's base. A circle of insulating material surrounds the base of the beam and creates a gap between the beam and the cylinder's oblique, conical interior walls. The beam and cylinder walls are electrically conductive. Gravity holds an electrically conductive sphere in contact with both the beam and a oblique surface, creating a closed circuit. Any lessening of the gravitational force causes the sphere to break contact with either or both of the beam and interior walls, creating an open circuit.

Various examples for practicing the invention, other advantages, and novel features thereof will be apparent from the following detailed description of various illustrative preferred embodiments of the invention, reference being made to the accompanying drawings.

BRIEF DESCRIPTION OF THE DRAWINGS

The present invention is illustrated by way of example and not limitation in the figures of the accompanying drawings in which like references indicate similar elements.

DETAILED DESCRIPTION

The acceleration sensor shown illustratively in the accompanying drawings is particularly suited to be of relatively small size for use in data processing systems used in notebook computer systems, digital cameras, music recording and playback devices, automobiles, marine vessels, aircraft, spacecraft, and similar equipment. Additionally, the embodiments of the present invention may be especially suited for use in a variety of additional applications not having data storage devices coupled to actuators and heads where it is desired to sense acceleration or detect a state of free fall. For example, this invention could be used to trigger inflation of a cushion to soften the impact for a dropped camera.

Figure 1:
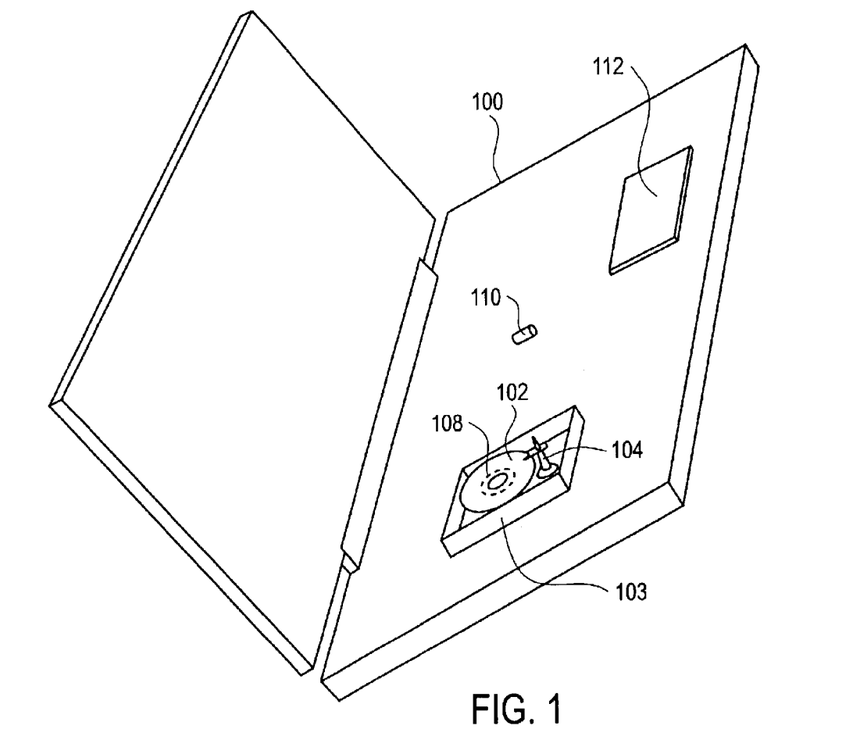
FIG. 1 is an exemplary view of a data processing system in free fall. As shown, the data processing system contains a hard disc operatively coupled to a read/write head. An embodiment of the present invention has sensed free fall and safely parked the actuator and magnetic head prior to impact.

FIG. 1 shows a perspective view of a hard drive system. Typically, a data storage device 103, such as a hard disc drive system, is installed within a main housing of a computer 100, such as the notebook computer illustratively shown. However, it is understood that the invention is not limited to computers such as the one illustratively shown in FIG. 1. Rather, the invention applies to and may complement any data storage device 103 wherever such device is located. For example, and for purposes of illustration only and not limitation, a data storage device 103, such as a hard disc drive, may be located within a camera or other portable consumer electronic device, within an onboard vehicular computer, an elevator, an amusement park ride, etc. Moreover, in other embodiments, the data storage device may store analog data instead of digital data and the data storage device may use optical mechanisms to read and/or write the data.

A data storage device 103, such as a hard disc drive, contains a data storage medium 102 such as a hard disc and an actuator 104 having a magnetic read/write head 106. Read/write head 106 reads and writes data to tracks 108 on spinning data storage medium 102, such as a hard disc. Acceleration sensor 110 and system electronics 112 are electrically coupled to the hard disc drive 103 such that when acceleration sensor 110 detects a state of free fall in which there is substantially zero perceived gravitational acceleration, system electronics 112 commands the disc drive 103 to put the actuator 104 and magnetic (or optical) head 106 in a parked position before the fall is completed.

Alternatively, sensor 110 can be used to detect changes in non-gravitational (inertial) acceleration, an acceleration or de-acceleration of the sensor's reference frame caused objects such as automobile or aircraft engines or vehicular brakes.

Preferably, acceleration sensor 110 is located near or at the center of mass of the object prone to free fall so that sensing of the free fall state will be independent of any rotation and centrifugal forces present during the fall. However, the invention includes all positions of acceleration sensor 110 and all locations for system electronics 112 that perform the monitoring and command functions described above. Illustratively, acceleration sensor 110 may be positioned as an integral component of data storage device 103 itself, or may be positioned as a non-integral component of data storage device 103 elsewhere within a data processing system.

In a preferred embodiment, acceleration sensor 110 is integrated with a data processing system containing a hard drive disk assembly 103. In a preferred embodiment, sensor 110 is incorporated within system by soldering leads 120 and 122 to pads on a substrate 124, for example, a printed circuit board.

Figure 2:
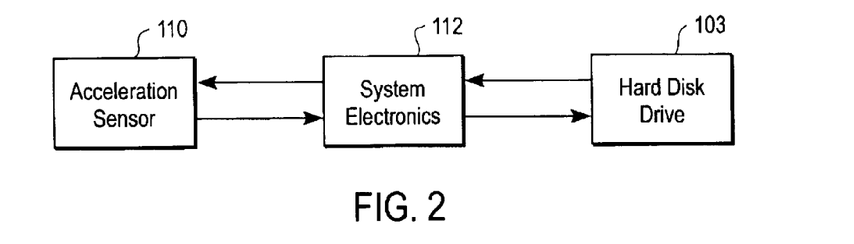
FIG. 2 is a schematic illustrating how system electronics within a data processing system can monitor an embodiment of the present invention and command a data storage device, such as a hard disc drive, to park an actuator and magnetic head when a state of free fall is detected.

FIG. 2 shows a schematic representation illustrating how system electronics 112 monitors acceleration sensor 110 and commands data storage device 103, such as a hard disc drive to park actuator 104 and magnetic head 106 in a safe position when a free fall is indicated or the gravitational force otherwise approaches zero.

Figure 5:
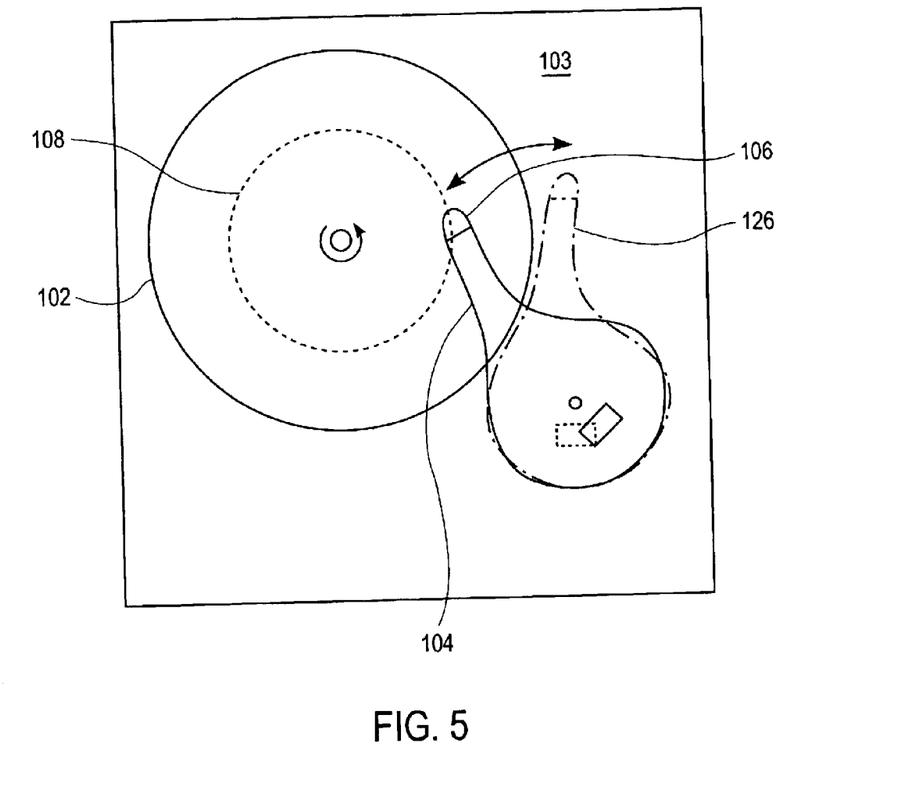
FIG. 5 illustrates a data storage device; such as a hard disc drive, and its associated actuator and magnetic head in operation. Dotted lines indicate the parked position of the actuator and head.

Acceleration sensor 110 is a simple electronic switch that remains closed when system 100 is at rest, and opens when system 100 begins to free fall. System electronics 112 continuously or periodically monitors acceleration sensor 110 to detect whether the switch is closed or open. Immediately upon detecting an open switch, system electronics 112 transmits a command to data storage device 103. Upon receiving this command, data storage device 103 immediately parks actuator 104 and magnetic head 106 in a safe position 126, as shown in FIG. 5. Safe position can be either a location to the side of data storage medium 102, as illustrated in FIG. 5, or a locked operating position that prevents head 106 from writing to the wrong track 108 and that prevents head 106 from vibrating against data storage medium 102. For example, in an optical drive, a safe position 126 could be a location where the objective lens is pinned against its upper stop.

Figure 3:
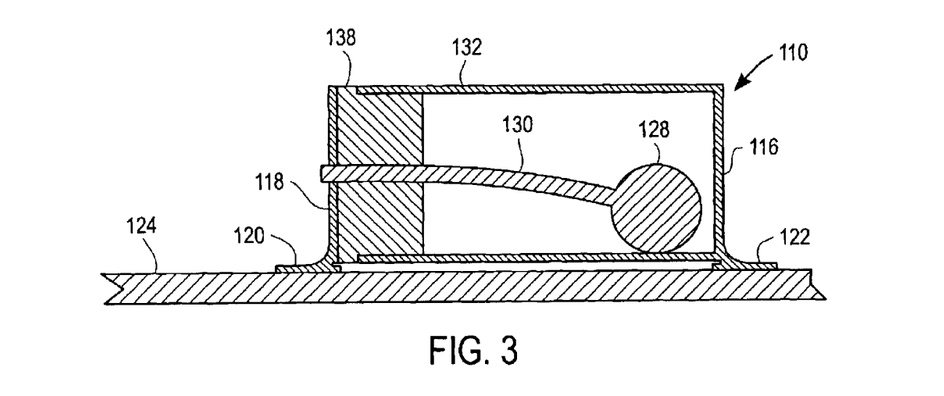
FIG. 3 illustrates an exemplary embodiment of the present invention in the at rest state according to one aspect of the present invention.

FIG. 3 shows a cross-sectional side view of a preferred embodiment of acceleration sensor 110. Sensor 110 includes a casing connection 116 and a beam connection 118. Casing connection 116 is connected to a first lead 120, and beam connection 118 is connected to a second lead 122. FIG. 3 shows sensor 110 in an at rest position. In this position, gravity pulls electrically conductive mass 128, attached to one end of electrically conductive beam 130, into contact with electrically conductive casing 132. Preferably, one end of beam 130 is supported by insulating support material 138, which may be flexible or rigid. In the illustrated embodiment, insulating support material 138 is rigid.

Beam 130 may have any aspect ratio, meaning that beam 130 can have any cross-sectional shape. As exemplified in FIG. 3, beam 130 is flexible and electrically conductive. Preferably, the flexural constant of beam 130 is such that mass 128 contacts casing 132 when acted on by a gravitational force. Specifically, the flexural characteristics of the beam should be chosen so that two conditions are met:

1. The at rest gravitational force bends the beam, or beam/flexible mount combination, so that the beam or beam/mass makes electrical contact with the casing.

2. The lack of gravitational force during free fall allows the beam or flexible mount to straighten and break the electrical contact between the beam or beam/mass and the casing.

In a preferred embodiment, insulating support material 138 is a rigid material such as glass, but other insulating materials such as plastic, epoxy, ceramic, etc. may also be used.

In an exemplary embodiment, free end of the beam 130 may be weighted with a mass 128 to increase gravitational deflection and flex beam 130 such that the mass 128 contacts the electrically conductive casing 132. However, the invention can operate without mass 128. For example, in an illustrative embodiment, the shape of the beam 130, its dimensions, and the material comprising the beam 130 can be chosen such that the weight of the cantilevered portion of beam 130 itself flexes the free end of beam 130 into contact with a electrically conductive casing 132.

If a mass is attached to the free end of beam 130, the mass 128 may take almost any size and shape since the size and shape of the mass 128 are not essential to the operation of the invention. It makes no difference whether the shape of the mass 128 is circular, squarish, polygonal, or triangular, as long as the mass is made of or carries an electrically conductive material and contacts electrically conductive casing 132 when the data storage device 103 is at rest. The preferable shape of the mass 128, as illustratively shown in the Figures is spherical.

According to one aspect of the present invention, the beam 130 and mass 128 are made of conductive materials or carry conductive means. Thus, electrical contact is made whenever either the free end of beam 130 or mass 128 touches casing 132. In this manner, the invention acts as an electrical switch, closed when at rest and open when in free fall. Beam 130 and mass 128 may be formed as one piece of electrically conductive material, or from separate pieces joined together by any suitable method, including, but not limited to, screwing, gluing, soldering, etc.

It should be noted that the dimensions of the components of acceleration sensor 110 are scalable, meaning of course, that one skilled in the art can determine the mechanical coefficients of non-electrically conductive insulating material 138 and beam 130 easily and without undue experimentation. Accordingly, one skilled in the art could readily manufacture acceleration sensor 110 illustrated in FIGS. 1–3 in any one of a number of possible sizes. In a preferred embodiment, however, acceleration sensor 110 is approximately 4–6 mm long, 2–3 mm wide and 2–3 mm high. These preferred dimensions, however, are given only for purposes of illustration, and are not meant to limit the size of acceleration sensor 110 in any fashion. Rather the invention includes all sizes of acceleration sensor 110.

Preferably, as illustratively shown in FIG. 3, the sensor 110 described above is enclosed by a tubular casing 132 formed of an electrically conductive material. In an exemplary embodiment, insulating support material 138 completely fills one end of the tubular casing, while the second end is also closed. The interior of casing 132 may be filled with a gas of the type well known in the art for sealing the interiors of electronic components to prevent corrosion of electrical contacts. However, it is not necessary to close the second end of the casing, nor is it necessary that the casing be tubular. Rather, the second end of the casing may be left open, and the casing may take almost any structural form, including, but not limited to tubes, circles, squares, triangles, polygons, etc. In a preferred embodiment, one end of casing 132 is connected to the first electrically conductive lead 122, while the beam connection 118 is connected to a second electrically conductive lead 120.

In an alternative embodiment, the present invention may be made and operated without a tubular casing 132. For example, fixed end of beam 130 could be supported by insulating support member 138 and operatively connected via beam connection 118 to electrically conductive lead 120, such that the free end of beam 130 or mass 128 was positioned to make physical contact with an electrically conductive pad when the data storage device 103 is at rest.

Figure 4:
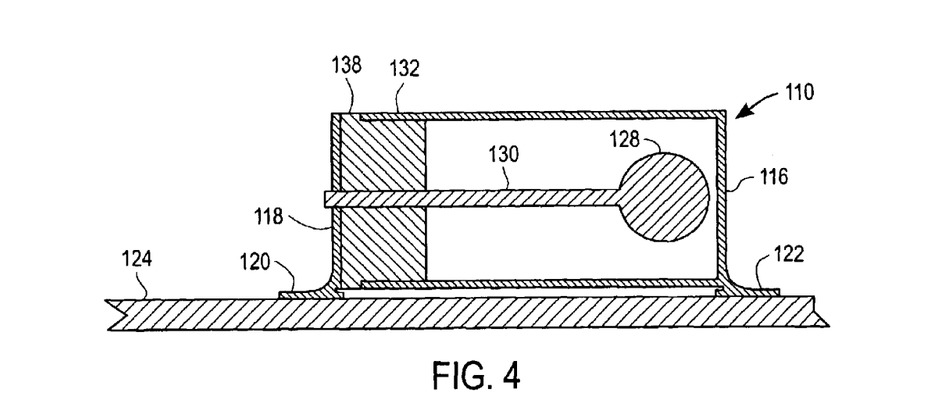
FIG. 4 illustrates an exemplary embodiment of the present invention in a state of free fall according to an aspect of the present invention.

FIG. 4 shows acceleration sensor 110 in a free fall position. In the absence of a gravitational force (e.g. during free fall), physical contact with the casing 132 is broken as the beam 130 straightens to an approximately horizontal position shown in FIG. 4. Thus, sensor 110 functions as a switch, closed when at rest, open when in free fall. Breaking physical contact with casing 132 immediately alerts system electronics 112 (shown in FIG. 1) to command data storage device 103, such as a hard disc drive (FIG. 1) to park actuator 104 (FIG. 1) containing magnetic read/write head 106 (FIG. 1) in a safe position 126 (shown in FIG. 5). Alternatively, the same method may be used with another embodiment of the present invention in which mass 128 makes electrical contact with casing 132. In such an embodiment, the switch would be open in the at rest position and closed during free fall. From rest, an object within the Earth's gravitational field free falls 0.5 meters in 0.32 seconds. The time required to process a command and park the head in a disc drive is typically less than 0.04 seconds. Thus, the head can be parked in a safe position well before the fall is completed.

FIG. 5 is a top-down view of hard disk drive showing actuator 104 and magnetic read/write head 106 in an operating position. A safe parked position 126 is indicated by broken lines. Data storage device 103, such as a hard disc drive is operatively coupled to system electronics 112 (not shown). In response to commands from system electronics 112, data storage device 103 moves actuator 104 and magnetic read/write head 106 rapidly sideways in a plane approximately parallel to the disk 102 between its operating position and a parked position, which is illustratively depicted as safe position 126 in FIG. 5.

Figure 6:
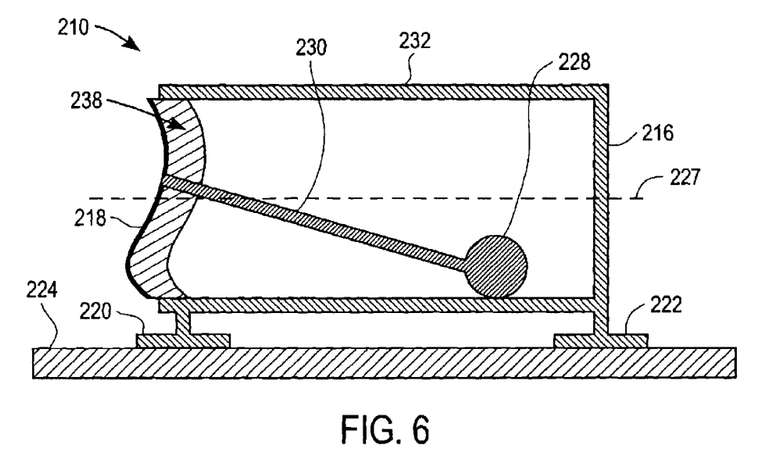
FIG. 6 illustrates an exemplary embodiment of the present invention in the at rest state according to another aspect of the invention

FIG. 6 is a side view of sensor 110 according to a preferred embodiment of the present invention. In this Figure, sensor 110 is shown at rest in a gravitational field. In this embodiment, beam 230 is rigid. One end of beam 230 is inserted into insulating support material 238, while the other end is attached to mass 228. Mass 228 may be of any shape, but preferably is spherical. According to one aspect of the present invention, insulating support material 238 is flexible and adheres to electrically conductive beam connection 218, which is also flexible. Illustratively, insulating non-electrically conductive support material 238 is a semi-rigid or flexible material such as rubber.

When at acceleration sensor 110 is at rest, gravitational force pulls free end, including mass 228, of rigid electrically conductive beam 230 into contact with electrically conductive casing 232. When tilted by a gravitational force, rigid beam 230 deforms insulating support material 238 as shown. In an exemplary embodiment according to one aspect of the invention, beam 230 and support material 238 may both be flexible.

Figure 7:
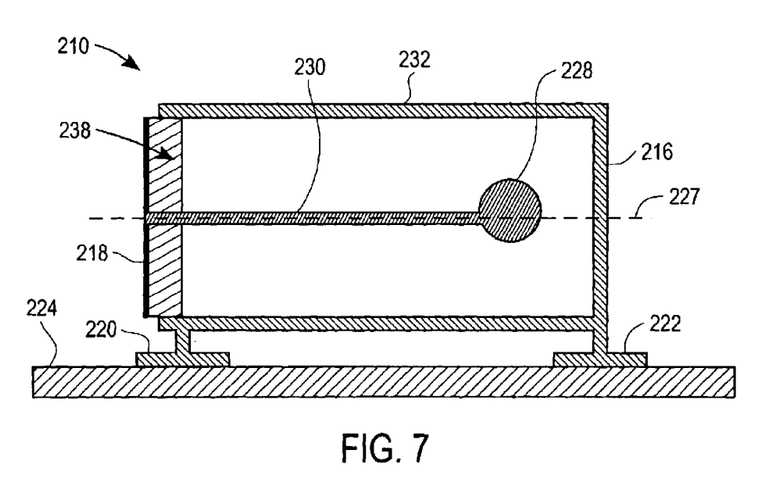
FIG. 7 illustrates an exemplary embodiment of the present invention in a state of free fall according to another aspect of the invention.

FIG. 7 illustratively shows sensor 210 during free fall, a period of minimal gravitational acceleration. During free fall, minimal gravitational acceleration and the restoring forces in deformed insulating support material 238 cause mass 228 to break contact with casing 232 and to return approximately to a position delineated by horizontal axis 227.

FIG. 7 shows an illustrative embodiment of the present invention in which beam 230 is formed of a rigid, electrically conductive material. In this embodiment, rigid beam 230 is capable of moving between an at-rest position and a free-fall position. Preferably, rigid beam 230 is supported at one end by a semi-rigid or flexible, non-electrically conductive insulating support material 238.

Figure 8A:
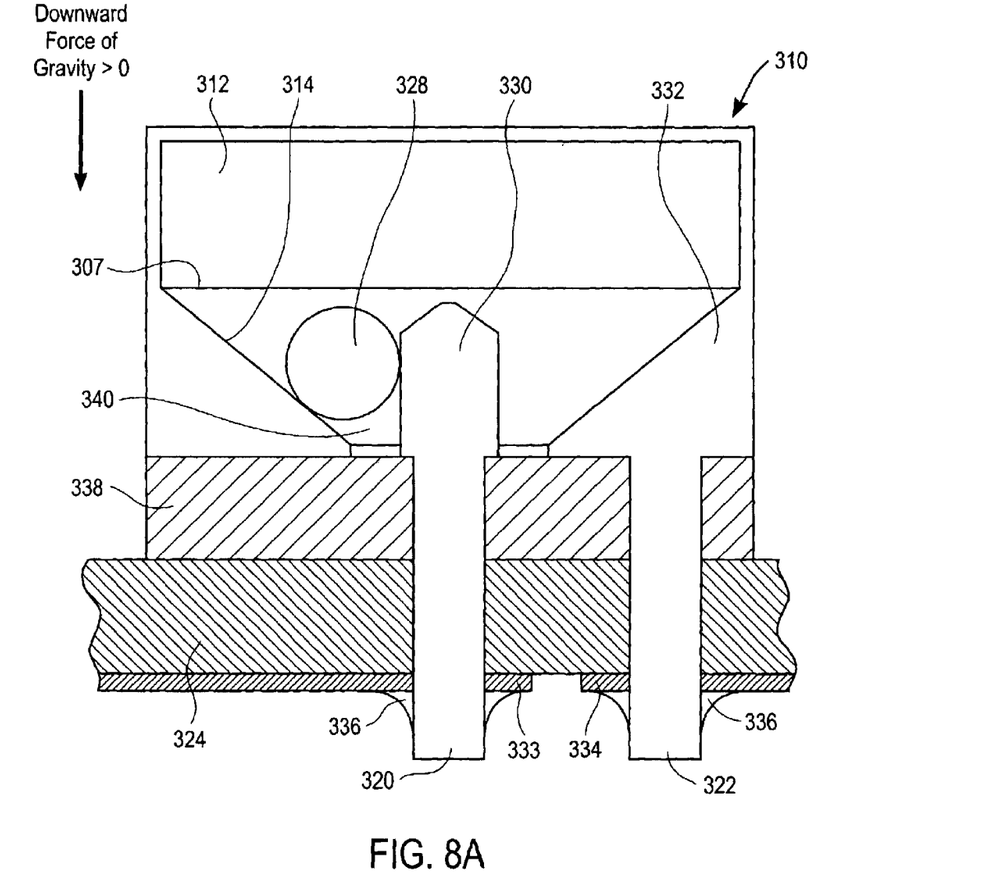
FIG. 8A is a side view illustrating an exemplary embodiment of the present invention in the at rest state according to another aspect of the present invention.

FIGS. 8A–8D show various views of an acceleration sensor according to particular exemplary embodiments of the present invention. FIG. 8A is a cross-sectional side view of a gravitational acceleration sensor 110. In this illustrative embodiment, acceleration sensor 110 includes a casing 332, which rests on non-conducting insulating base 338, an electrode 330, and a spherical mass 328. This embodiment, like others previously described, acts as an electrical switch, closed when the sensor is at rest and open during free fall. In the at rest position, mass 328 contacts both beam 330 and casing 332. During free fall, mass 328 does not contact beam 330 and case 332. The phrase "does not contact beam 330 and case 332" further includes situations where: mass 328 contacts casing 332 only; mass 328 contacts beam 330 only; or mass 328 does not contact beam 330 or casing 332.

Non-conducting insulating base 338 may be formed of any suitable insulating material known in the art. The insulating material may be either fixed or semi-rigid. In a preferred embodiment, insulating base 338 may be made as thick or as thin as practicable. Conducting inner electrode 330 (hereinafter beam 330) is vertically positioned in insulating base 338. According to an aspect of the present invention, a top portion of beam 330 juts out into internal cavity 312 of casing 332, while a middle portion passes through insulating base 338. A bottom portion of beam 330, (hereinafter first conducting pin 320) extends past the exterior of insulating base 338 and removably inserts into a substrate such as a printed circuit board 324. Similarly, a second conducting pin 322,vertically positioned substantially parallel to beam 330, also extends past the exterior of insulating base 338 and removably inserts or connects into a substrate such as a printed circuit board 324. Electrically conductive traces 333 and 334 connect sensor 310 to system electronics 112 (not shown), which monitor sensor 310 and command data storage device 103 (not shown) to park the magnetic or optical head whenever conducting ball 328 (hereinafter mass 328) breaks electrical contact between beam 330 and casing 332.

According to an aspect of the present invention, beam 330, conducting pins 320 and 322, mass 328, and casing 332 are each made of or carry electrically conductive materials. Examples of such electrically conductive materials include, but are not limited to: copper, brass, silver, gold, steel, and similar materials.

According to another aspect of the present invention, a bottom portion of the interior of casing 332 is angled to form an oblique surface 314, which extends from a point approximately located at horizontal axis 307 down to insulating base 338 such that a ringed gap 340 encircles beam 330. In a preferred embodiment, mass 328 is a sphere and gap 340 is not greater than the diameter of mass 328. Gap 340 has a width sufficient that mass 328 contacts both casing 332 and beam 330 simultaneously when sensor 110 is at rest, and a width sufficient that insulating base 338 insulates beam 330 from casing 332. Illustratively, oblique surface 314 angles downwards at approximately a 45 degree angle to channel mass 328 into electrical contact with beam 330 when mass 328 is acted upon by a gravitational force. However, oblique surface 314 may be sloped at almost any angle less than 90 degrees so long as it channels mass 328 into electrical contact with beam 330. According to another aspect of the invention, the interior and exterior surfaces of casing 332 are cylindrical, while the exterior of casing 332 may be of any shape. Internal cavity 312 may be filled with an inert gas or non-conducting liquid to prevent corrosion of beam 330, casing 332, and mass 328. As used herein "mass 328" means contactor.

Figure 8B:
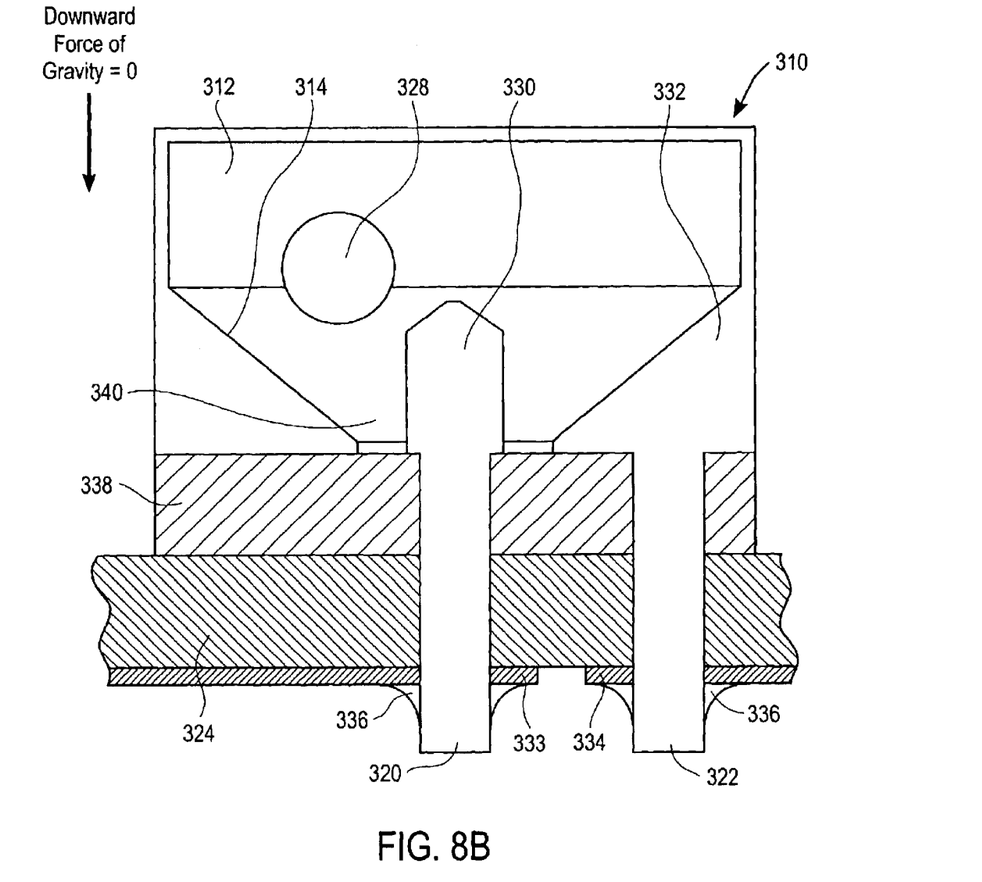
FIG. 8B is a side view illustrating an exemplary embodiment of the present invention in a state of free fall according to another aspect of the present invention.

FIG. 8B illustrates how sensor 310 operates in the absence of a gravitational force. The unique oblique interior walls 314 permit the mass 328 to break away from the beam 330 and/or casing 332 when the force of gravity is reduced to zero by free fall of the device. An open circuit between the beam 330 and casing 332, implying the absence of a gravitational force, signals system electronics 112 (FIG. 1) to command hard disk drive 103 (FIG. 1) to park magnetic data actuating head 106 (FIG. 1) in a safe position 126 (FIG. 5).

Figure 8C:
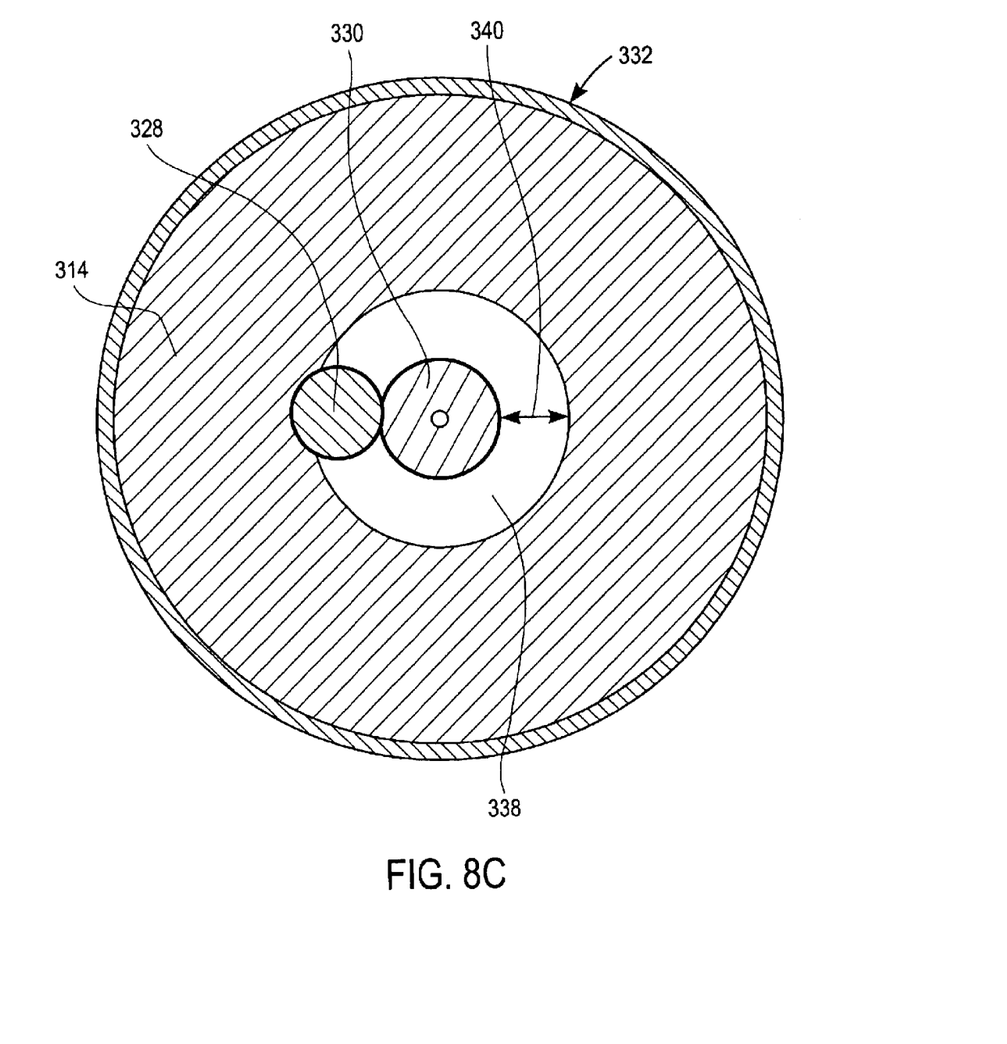
FIG. 8C is an overhead view illustrating an exemplary embodiment of the present invention in the at rest state according to another aspect of the present invention.

FIG. 8C is a top-down view of gravitational sensor 310 illustratively showing how oblique surface 314 holds mass 328 in contact with beam 330 when sensor 310 is acted upon by a gravitational force. In this view, the top cover of sensor 310 has been removed.

The illustrative dimensions of sensor 310 and its components are now described. According to an aspect of the present invention, the diameter of casing 332 is approximately 10 mm, the depth, approximately 5 mm. The diameter of mass 328 measures approximately 2 mm, while the diameter of beam 330 measures approximately 2 mm. The diameter of the ringed gap 340 of insulating material 338 surrounding beam 330 measures approximately 3 mm. It will be understood that these ranges are provided only for purposes of illustration. The diameter of the sensor 310 and the diameters of its components are free design parameters. The values shown or described are informative and exemplary only and should not be construed as limiting the invention in any way.

Figure 8D:
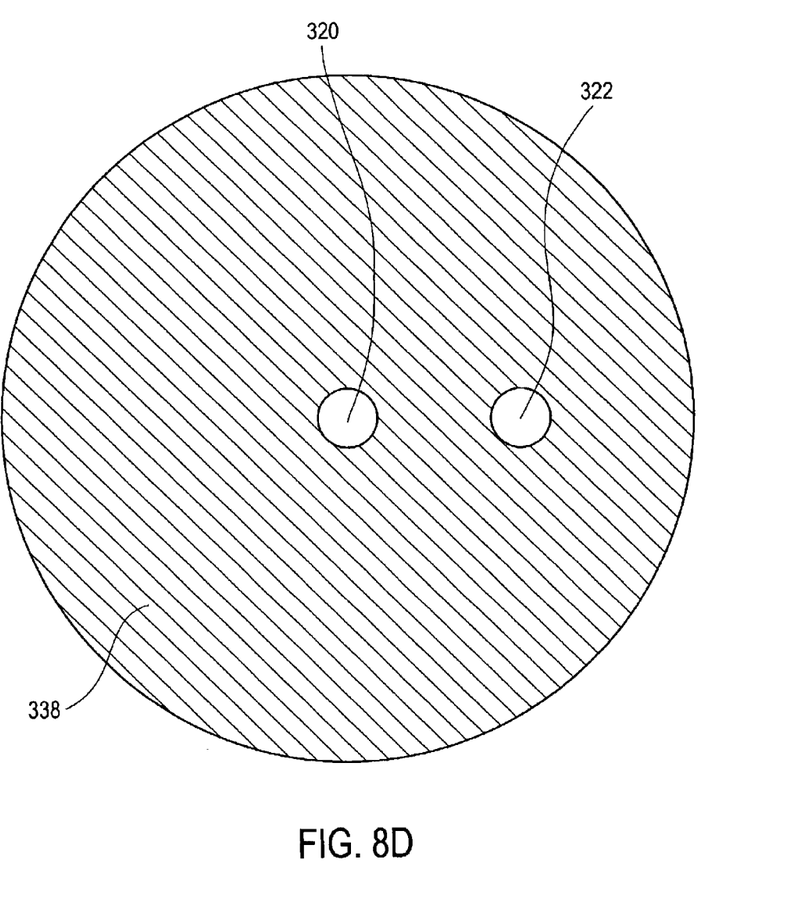
FIG. 8D is an bottom view illustrating an exemplary embodiment of the present invention.

FIG. 8D shows a bottom view a gravitational sensor according to an aspect of the present invention. In this exemplary embodiment, first conductive pin 320 is centrally mounted within insulating base 338. Illustratively, second conductive pin 322 may be positioned anywhere within or without the circumference of insulating base 338 provided second conductive pin 322 does not electrically contact first conductive pin 320.

The foregoing description of a preferred embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and in various modifications as are suited to the particular use contemplated. It is intended that the scope of the invention not be limited by the specification, but be defined by the claims set forth below.

I claim:

1. An acceleration sensor, comprising:
   a non-electrically conductive support material;
   an electrically conductive tubular casing coupled to said support material; and
   a beam having a first end and a second end, said first end supported by said support material, wherein said support material is flexible.

2. An acceleration sensor as recited in claim 1 wherein said beam is rigid or flexible.

3. An acceleration sensor as recited in claim 2 wherein said second end of said beam contacts said casing when said sensor is at rest.

4. An acceleration sensor as recited in claim 2 wherein said second end of said beam does not contact said casing during free fall.

5. An acceleration sensor as recited in claim 2, further comprising:
   a mass attached to said second end of said beam.

6. An acceleration sensor as recited in claim 5 wherein said mass contacts said casing when said sensor is at rest.

7. An acceleration sensor as recited in claim 6 wherein said mass, said casing, and said beam are each electrically conductive.

8. An acceleration sensor as recited in claim 5 wherein said mass does not contact said casing when said sensor is at rest.

9. An acceleration sensor as recited in claim 2, further comprising:
   means to couple said sensor to a substrate.

10. An acceleration sensor as recited in claim 9 wherein said means is one of at least one lead or one conductive pin.

11. An acceleration sensor as recited in claim 1 wherein said tubular casing is closed at both ends and filled with an inert gas or non-electrically conductive liquid.

12. An acceleration detector, comprising:
    an electrically insulating support material, said support material being flexible;
    an electrically conductive cylindrical casing attached to said support material, said casing having an interior; and
    a beam located within said casing's interior and protruding through said support material.

13. An acceleration sensor as recited in claim 12 wherein said casing has oblique interior walls.

14. An acceleration sensor as recited in claim 13, further comprising:
    a ring of insulating material separating said beam from said oblique interior walls, and
    a mass located with said interior of said casing.

15. An acceleration sensor as recited in claim 14 wherein said mass, casing, and beam are electrically conductive.

16. An acceleration sensor as recited in claim 15 wherein said mass is spherical and wherein said mass contacts said beam and said oblique surface when said sensor is at rest.

17. An acceleration sensor as recited in claim 15 wherein said mass is spherical and wherein said mass does not contact said beam and said oblique surface during free fall.

18. An acceleration sensor as recited in claim 12 wherein said cylindrical casing is closed at both ends and filled with an inert gas or non-electrically conductive liquid.

19. An acceleration sensor as recited in claim 18, further comprising:
    means to couple said sensor to a substrate.

20. An acceleration sensor as recited in claim 19 wherein said means is one of at least one lead or one conductive pin.

* * * * *